United States Patent
Kranz et al.

[11] Patent Number: 5,927,870
[45] Date of Patent: Jul. 27, 1999

[54] ANGULAR THRUST WASHER

[75] Inventors: Sven Kranz, Rothenbach; Wilfried Soyka, Herzogenaurach, both of Germany

[73] Assignee: INA Walzlager Schaeffer oHG, Germany

[21] Appl. No.: 09/038,361

[22] Filed: Mar. 10, 1998

[30] Foreign Application Priority Data

Apr. 18, 1997 [DE] Germany .......................... 197 16 195

[51] Int. Cl.⁶ ............................................... F16C 33/58
[52] U.S. Cl. .............................................................. 384/622
[58] Field of Search .................................. 384/622, 615, 384/621, 620, 617

[56] References Cited

U.S. PATENT DOCUMENTS 4,915,512   4/1990   Hilby et al. .
5,489,255   2/1996   Hinckley et al. .

FOREIGN PATENT DOCUMENTS 335235     2/1977   Austria .
342935     4/1978   Austria .
36434584   8/1987   Germany .
3840957    7/1989   Germany .
4416320    1/1995   Germany .

*Primary Examiner*—Lenard A. Footland
*Attorney, Agent, or Firm*—Bierman, Muserlian and Lucas

[57] ABSTRACT

An angular thrust washer (1) for a thrust bearing comprising a radial portion (2) serving as a raceway, said radial portion (2) merging into at least one axially extending angled portion (4), and rotation being prevented by at least one projection which engages a recess (9) of a housing (6) whereby the projection is configured as a flat retention tongue (5) formed integrally on the radial portion (2) and projecting beyond the radial portion (2) in radial direction while being arranged in a plane which is axially offset from the radial portion (2) towards a bottom of the recess (9) which prevents a contact between the shaping radii (12) of the retention tongue (5) and the side walls (10, 11) formed during manufacture and the run-out radii (13) of recess.

6 Claims, 2 Drawing Sheets

ANGULAR THRUST WASHER

FIELD OF THE INVENTION

The invention relates to an angular thrust washer for a thrust bearing comprising a radial portion forming a raceway, said radial portion merging into at least one axially extending angled portion, and rotation being prevented by at least one projection which engages a recess of a housing.

BACKGROUND OF THE INVENTION

An angular thrust washer of this type known from DE 44 16 320 A1 comprises a radial portion which serves as a raceway for cylindrical rolling elements while merging at its outer and inner circumference into angled portions extending in opposite directions. The outer angled portion comprises a projection which is formed by stamping and engages a recess which prevents a rotation of the angular thrust washer in a housing.

A drawback of this thrust washer is that both the lug-type projection and the recess of the housing have a shaping radius resulting from the manufacturing process, i.e. they are at least partly arc-shaped. The shaping radii of the projection of the angular thrust washer and of the recess of the housing bear against each other so that a reliable retention of the projection in the housing recess is not guaranteed due to the arc-shaped contact surfaces. It is possible for the projection to sink into the recess of the housing in a peripheral direction which would mean that a real prevention of rotation does not exist. Moreover, due to this sinking-in of the projection into the recess of the housing, there is also a danger of the angular thrust washer itself being negatively influenced, for example, by a development of undesired stresses in the washer.

OBJECTS OF THE INVENTION

It is an object of the invention to create a security device against rotation of an angular thrust washer which on the one hand, guarantees a reliable prevention of rotation and on the other hand, has no negative influence on the angular thrust washer itself.

This and other objects and advantages of the invention will become obvious from the following detailed description.

SUMMARY OF THE INVENTION

The angular thrust washer of the invention for a thrust bearing comprising a radial portion forming a raceway, said radial portion merging into at least one axially extending angled portion, and rotation being prevented by at least one projection which engages a recess of a housing, is characterized in that the projection is configured as a flat retention tongue formed integrally on the radial portion and projecting beyond the radial portion in radial direction while being arranged in a plane which is axially offset from the radial portion towards a bottom of the recess.

With this solution offered by the invention, is not only an exactly defined stop surface created in peripheral direction by the sectional geometry of the retention tongue but, due to its offset arrangement, the retention tongue is in direct contact with the bottom of the recess so that contact between the shaping radii of the retention tongue and the recess is prevented. This assures a reliable retention of the angular thrust washer in the housing, even in the presence of high torques.

In an advantageous embodiment of the invention, the retention tongue is connected to the angled portion by axially extending side walls on its two ends situated opposite each other in peripheral direction. These side walls stabilize the retention tongue and result in an enlarged stop surface in the recess of the housing so that the angular thrust washer does not rotate in the housing, even when high torques occur. The side walls can be advantageously configured so as to taper off in radially inward or outward direction. This configuration of the side wall enables a particularly simple manufacturing of the side walls by non-cutting shaping.

According to a further advantageous feature of the invention, angled portions extending in axially opposite directions are arranged on the inner and the outer circumference of the angular thrust washer, the retention tongue being arranged on the inner or the outer circumference to extend radially inwards or outwards. This is a simple means of adapting the angular thrust washer to different installation requirements.

Finally, in another embodiment of the invention, a plurality of equally spaced retention tongues are arranged on the periphery of the angular thrust washer. Advantageously, three retention tongues are arranged at 120° to each other to guarantee an absolutely reliable prevention of rotation of the washer even at high torques.

BRIEF DESCRIPTION OF THE DRAWINGS

The invention will now be described with the help of an example of embodiment illustrated in the appended drawings.

DETAILED DESCRIPTION OF THE DRAWINGS

Figure 1:
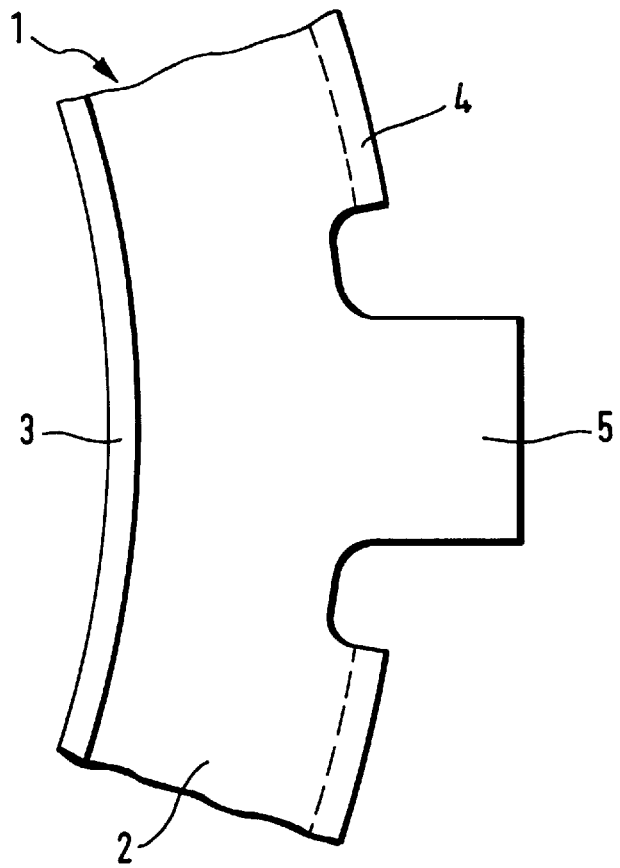
FIG. 1 is a top view of an angular thrust washer in which the retention tongue is not offset.

The angular thrust washer identified at 1 in FIG. 1 comprises a radial portion 2 having a circular ring-shaped profile to form a raceway. Two oppositely oriented angled portions 3 and 4 extend from the inner and the outer circumference of the radial portion 2. A flat retention tongue 5 formed integrally on the radial portion 2 to project outwards beyond the radial portion 2 extends from the outer circumference of the angular thrust washer 1. However, the retention tongue 5 is not continuously offset, i.e. in one peripheral region, it forms an extension of the radial portion 2 in one and the same axial plane.

Figure 2:
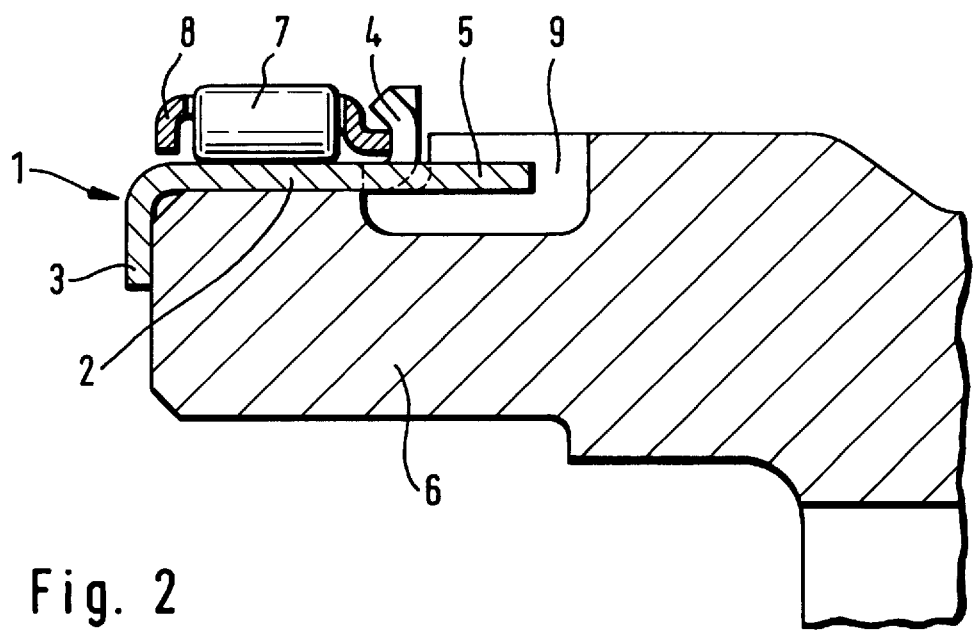
FIG. 2 is a longitudinal cross-sectional view showing a thrust bearing installed in a housing, with the retention tongue not offset.

The angular thrust washer represented in FIG. 2 also comprises angled portions 3, 4 extending in opposite directions from the radial portion 2, the angled portion 3 surrounding a housing 6 in peripheral direction while the angled portion 4 engages an inner diameter of a cage 8 filled with rolling elements 7. A retention tongue 5 arranged on an inner diameter of the angular thrust washer 1 interlocks with a recess 9 of the housing 6 and thus prevents a rotation of the angular thrust washer 1 in peripheral direction. In this type of installation too, the radial portion 2 and the integrally formed retention tongue 5 are situated in the same axial plane, i.e. contact between the rounded regions of the retention tongue 5 and of the recess 9 of the housing 6 is not avoided.

Figure 3:
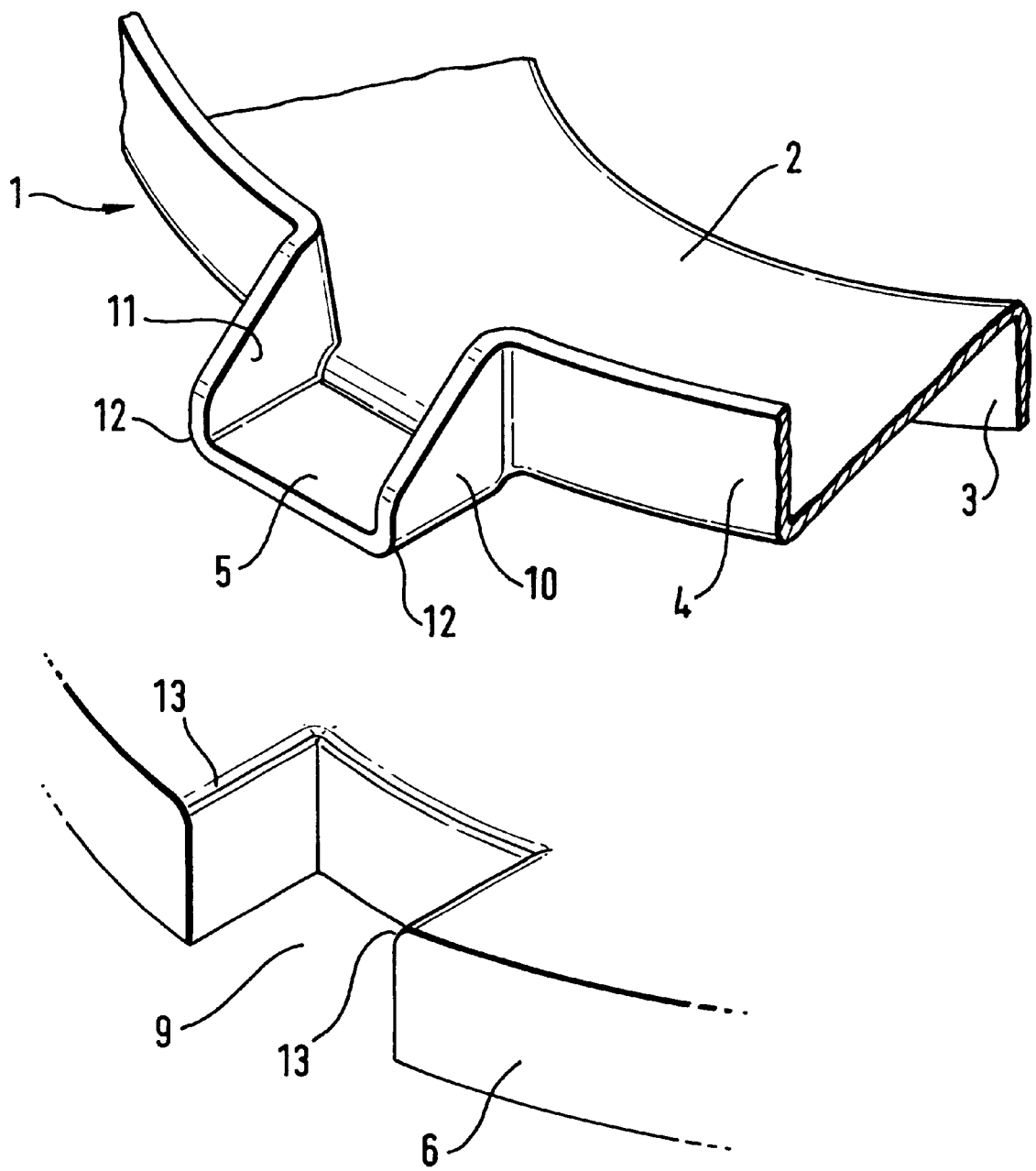
FIG. 3 is a schematic, perspective representation of an angular thrust washer of the invention and an associated housing recess.

The angular thrust washer 1 of the invention represented in perspective in FIG. 3 prevents such a contact. The retention tongue 5 formed integrally on the outer circumference of the radial portion 2 is provided on its ends situated opposite each other in peripheral direction with axially extending side walls 10, 11 by which the integrally formed retention tongue 5 is connected to the angled portion 4. To prevent a contact between the shaping radii 12 formed in the region of the retention tongue 5 and the side walls 10, 11 during manufacture and the run-out radii 13 of the recess 9 of the housing 6 likewise formed during manufacture, the retention tongue 5 of the invention is offset towards the bottom of the recess 9, i.e. the radial portion 2 and the retention tongue 5 formed integrally thereon are arranged in planes which are axially offset to each other. By this, it is achieved that the rounded parts of the retention tongue 5 and the side walls 10, 11 come into contact with the unrounded region of the recess 9.

Various modifications of the angular thrust washer of the invention may be made be made without departing from the spirit or scope thereof and it is to be understood that the invention is intended to be limited only as defined in the appended claims.

What we claim is:

1. An angular thrust washer (1) for a thrust bearing comprising a radial portion (2) forming a raceway, said radial portion (2) merging into at least one axially extending angled portion (4), and rotation being prevented by at least one projection which engages a recess (9) of a housing (6), characterized in that the projection is configured as a flat retention tongue (5) formed integrally on the radial portion (2) and projecting beyond the radial portion (2) in radial direction while being arranged in a plane which is axially offset from the radial portion (2) towards a bottom of the recess (9).

2. An angular thrust washer (1) of claim 1 wherein the retention tongue (5) is connected to the angled portion (4) by axially extending side walls (10, 11) on two ends situated opposite each other in peripheral direction.

3. An angular thrust washer (1) of claim 2 wherein the side walls (10, 11) taper off in one of a radially inward and a radially outward direction.

4. An angular thrust washer (1) of claim 1 wherein angled portions (3, 4) extending in axially opposite directions are arranged on an inner and an outer circumference of the angular thrust washer (1), and the retention tongue (5) is arranged on one of the inner and the outer circumference.

5. An angular thrust washer (1) of claim 1 wherein the retention tongue (5) extends in one of a radially inward and a radially outward direction.

6. An angular thrust washer (1) of claim 1 wherein a plurality of equally spaced retention tongues (5) are arranged on a circumference of the angular thrust washer (1).

* * * * *